Figure 1:
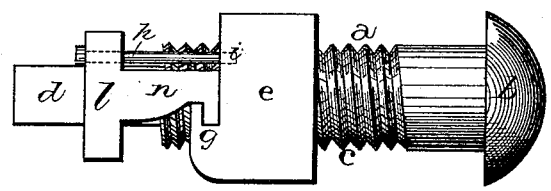
Figure 2:
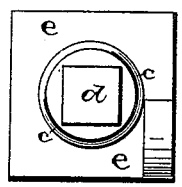

W. WALTER.
Nut-Lock.

No. 202,310. Patented April 9, 1878.

Witnesses:
J. W. Garner
W. S. D. Haines

Inventor:
Wm. Walter
per
F. A. Lehmann,
Atty.

UNITED STATES PATENT OFFICE.

WILLIAM WALTER, OF LATROBE, PENNSYLVANIA.

IMPROVEMENT IN NUT-LOCKS.

Specification forming part of Letters Patent No. 202,310, dated April 9, 1878; application filed March 18, 1878.

*To all whom it may concern:*

Be it known that I, WM. WALTER, of Latrobe, in the county of Westmoreland and State of Pennsylvania, have invented certain new and useful Improvements in Nut-Locks; and I do hereby declare the following to be a full, clear, and exact description of the invention, such as will enable others skilled in the art to which it pertains to make and use it, reference being had to the accompanying drawings, which form part of this specification.

My invention relates to an improvement in nut-locks; and it consists in a nut which is screwed upon a bolt which has a catch or shoulder formed upon one of its edges, and a stop, which is passed over the square end of the bolt until the projection on its lower side catches behind the shoulder on the nut, and thus prevents the nut from turning backward, as will be more fully described hereinafter.

The accompanying drawings represent my invention.

*a* represents a bolt, having a head, *b*, upon one end, and a screw-thread, *c*, formed upon its surface, just inside of the square portion *d*. This square portion extends from the outer end down to the screw-thread, and may be made of any length desired; but the thickness of the bolt at this point should be less than that of the screw-thread, so as not to interfere with the passage of the nut *e* over it. Upon one edge of this nut is formed the catch or shoulder *g*, and just back of this shoulder is formed a hole or recess, *i*, to receive a pin, *h*.

Slipping over the square end of the bolt is the stop *l*, which has the projection *n* extending from its inner side, so as to rest against the nut and catch behind the shoulder *g*, and thus prevent the nut from turning backward. After the bolt has been passed through a rail or other object, the nut is screwed into position, so that the shoulder *g* will be a little to the right of the projection *n* after the stop has been passed over the square end of the bolt, so that it can be turned slightly backward, and thus cause the projection and shoulder to lock together. As the end of the projection and the shoulder are made of corresponding shape, and as the stop cannot possibly be turned backward on account of the square portion of the bolt, it will be seen that the bolt is locked in position beyond all possibility of its shaking loose. After the stop has had its lower end locked with the nut, a pin, *h*, is forced into the hole *i*, so as to prevent the stop being removed.

Having thus described my invention, I claim—

1. The combination of the bolt *a*, having a head, *b*, screw-thread *c*, and a square portion, *d*, with the nut *e* and stop *l*, substantially as shown.

2. The stop *l*, having the projection *n*, in combination with the shoulder *g* on the nut, and the pin *h*, substantially as described.

In testimony that I claim the foregoing I have hereunto set my hand this 9th day of March, 1878.

WILLIAM WALTER.

Witnesses:
 JNO. F. KNOX,
 LEWIS EISEMAN.